(12) United States Patent
Mossbeck et al.

(10) Patent No.: US 7,452,589 B2
(45) Date of Patent: *Nov. 18, 2008

(54) CONVOLUTED FIBER PAD

(75) Inventors: Niels S. Mossbeck, Carthage, MO (US);
Steven E. Ogle, Murphreesboro, TN (US)

(73) Assignee: L&P Property Management Company, South Gate, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/315,948

(22) Filed: Dec. 22, 2005

(65) Prior Publication Data

US 2006/0099869 A1     May 11, 2006

Related U.S. Application Data

(60) Division of application No. 10/445,706, filed on May 27, 2003, now Pat. No. 7,008,691, which is a continuation of application No. 10/068,111, filed on Feb. 6, 2002, now Pat. No. 6,596,387, which is a division of application No. 09/406,366, filed on Sep. 28, 1999, now Pat. No. 6,372,076.

(51) Int. Cl.
*B32B 3/28*   (2006.01)
*B32B 3/30*   (2006.01)
*D04H 3/05*   (2006.01)

(52) U.S. Cl. .................. 428/186; 428/161; 428/162; 428/170; 428/174; 428/179; 428/180; 442/327; 442/366

(58) Field of Classification Search .............. 442/327, 442/366; 428/161, 162, 170, 174, 179, 180, 428/186
See application file for complete search history.

(56) References Cited

U.S. PATENT DOCUMENTS

| 1,815,586 | A | 7/1931 | Robertson et al. |
| 2,689,811 | A | 9/1954 | Frederick et al. |
| 2,836,228 | A | 5/1958 | Dahle |

(Continued)

FOREIGN PATENT DOCUMENTS

DE     3818252 A1     5/1988

(Continued)

*Primary Examiner*—Norca Torres-Velazquez
(74) *Attorney, Agent, or Firm*—Conley Rose, P.C.; Kristin Jordan Harkins

(57) ABSTRACT

Present invention relates to a process of forming a multi-layer pad of a non-woven fiber batt and a foam layer having conforming convoluted surfaces and to a multi-layer pad incorporating a non-woven fiber batt and foam layer. The process of forming a non-woven batt layer and a foam layer having conforming convoluted surfaces comprises transporting each layer along its longitudinal dimension while compressing each layer along its lateral dimension. Concomitantly with compression, each layer is cut transversely along its lateral dimension to separate each layer into an upper segment and a lower segment and to provide conforming convoluted surfaces on the segments of each layer, the convoluted surfaces comprised of upstanding projections and depressions. The convoluted surfaces of the non-woven batt layer and the foam layer are aligned so that the upstanding projections of the batt convoluted surface project into the corresponding depressions of the foam convoluted surface, while the upstanding projections of the foam convoluted surface project into the corresponding depressions of the batt convoluted surface.

18 Claims, 4 Drawing Sheets

U.S. PATENT DOCUMENTS

| | | |
|---|---|---|
| 2,841,205 A | 7/1958 | Bird |
| 2,902,091 A | 9/1959 | Dahle |
| 3,009,848 A | 11/1961 | Simon |
| 3,179,317 A | 4/1965 | Voelker |
| 3,186,271 A | 6/1965 | Kaiser |
| 3,197,357 A | 7/1965 | Schulpen |
| 3,222,697 A | 12/1965 | Scheermesser |
| 3,240,855 A | 3/1966 | Voelker |
| 3,258,791 A | 7/1966 | Kaplan |
| 3,287,196 A | 11/1966 | Koller |
| 3,394,414 A | 7/1968 | Unger |
| 3,616,029 A | 10/1971 | Lerman |
| 3,684,140 A | 8/1972 | Voss |
| 3,738,884 A | 6/1973 | Soehngen |
| 3,786,701 A | 1/1974 | Ludwig |
| 3,874,964 A | 4/1975 | Cogliano et al. |
| 3,906,134 A | 9/1975 | Pohl |
| 3,945,627 A | 3/1976 | Simon |
| 4,064,578 A | 12/1977 | Yamada |
| 4,111,733 A | 9/1978 | Periers |
| 4,139,919 A | 2/1979 | Simon |
| 4,207,636 A | 6/1980 | Ceriani |
| 4,258,093 A | 3/1981 | Benedyk |
| 4,342,807 A * | 8/1982 | Rasen et al. ............... 428/180 |
| 4,401,004 A | 8/1983 | Glans et al. |
| 4,441,396 A | 4/1984 | Mercier et al. |
| 4,668,562 A | 5/1987 | Street |
| 4,673,452 A | 6/1987 | Awdhan |
| 4,699,032 A | 10/1987 | Clark, III |
| 4,700,447 A | 10/1987 | Spann |
| 4,965,901 A | 10/1990 | Normand |
| 5,022,111 A | 6/1991 | Fenner, Sr. |
| 5,136,740 A | 8/1992 | Kraft |
| 5,317,768 A | 6/1994 | Klancnik |
| 5,340,423 A | 8/1994 | Jacaruso et al. |
| 5,418,989 A | 5/1995 | Roe |
| 5,477,573 A | 12/1995 | Bonaddio et al. |
| 5,488,746 A | 2/1996 | Hudson |
| 5,490,890 A | 2/1996 | Morrison |
| 5,534,208 A | 7/1996 | Barr et al. |
| 5,618,610 A * | 4/1997 | Tomita et al. ............... 428/152 |
| 5,636,397 A | 6/1997 | Boyd et al. |
| 5,688,538 A | 11/1997 | Barr et al. |
| 5,702,801 A | 12/1997 | Chien |
| 5,707,906 A | 1/1998 | Eschenbach |
| 5,974,609 A | 11/1999 | Nunez et al. |
| 5,987,668 A | 11/1999 | Ackley |
| 6,372,076 B1 | 4/2002 | Ogle |
| D467,118 S | 12/2002 | McClure et al. |
| 6,500,292 B1 | 12/2002 | Mossbeck et al. |
| 6,596,387 B2 | 7/2003 | Ogle |
| 6,641,902 B1 * | 11/2003 | Kobayashi et al. .......... 428/220 |
| 6,740,610 B2 | 5/2004 | Mossbeck et al. |
| 6,890,622 B2 * | 5/2005 | Adam et al. ............... 428/171 |
| 7,008,691 B2 | 3/2006 | Ogle |
| 2006/0099869 A1 | 5/2006 | Mossbeck et al. |

FOREIGN PATENT DOCUMENTS

| | | |
|---|---|---|
| JP | 8906711109 | 3/1980 |

\* cited by examiner

CONVOLUTED FIBER PAD

CROSS-REFERENCE TO RELATED APPLICATIONS

The present application is a Division of U.S. patent application Ser. No. 10/445,706 filed May 27, 2003, now U.S. Pat. No. 7,008,691, which is a Continuation of U.S. patent application Ser. No. 10/068,111 filed Feb. 6, 2002, now U.S. Pat. No. 6,596,387, which is a Division of U.S. patent application Ser. No. 09/406,366, filed Sep. 28, 1999, now U.S. Pat. No. 6,372,076, all of which are hereby incorporated by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to a process of forming a fiber batt and, more particularly, a fiber batt formed to include a surface having a convoluted shape.

BACKGROUND

Mattresses and cushions for sofas, loveseats, chairs and other upholstery products generally comprise filler materials, batts, and foams, among other layering materials, for achieving a range of comfort, lot and durability. There are a number of advantages to be achieved by the construction of batts from synthetic, staple fiber material for use in mattresses and upholstery cushions. Such fibers are inherently lightweight and therefore easy to ship, store and manipulate during fabrication. These fibers are also generally less moisture absorbent than natural fibers such as cotton, or cellulosic based synthetic fibers such as rayon. Therefore, products made from these fibers can be maintained in a more hygienic condition and dried with much less expenditure of energy. When subjected to open flame, many of these fibers also tend to melt and drip rather than burn. While some of these fibers give off toxic flames, the escape of such fumes has been avoided or minimized by encapsulating the batt in a fire retardant or relatively air impermeable casing. In contrast, fibers such as cotton burn rapidly at high heat and generate dense smoke.

Synthetic fiber batts have been used in mattresses and upholstery cushions since batts maintain their comfort characteristics over time. Traditional batts having desired comfort and height characteristics may generally be too stiff to allow a mattress or futon to be easily rolled for storage or folded into a sofa. As disclosed in U.S. Pat. No. 4,668,562, a batt would be required to create a mattress having the desired comfort characteristics.

Foam materials, in combination with fiber layers, have also been used in the construction of mattresses and upholstery cushions. As disclosed in U.S. Pat. No. 5,317,768, the entire disclosure of which is incorporated herein by reference, an upper surface positioned on top of the general coil structure of a mattress includes a first layer of cover or ticking, a second layer of fiber or filler material, a third layer of a foam having convoluted surface which faces the second layer, and a farther layer of backing material. All four layers are stitched together in a quilt pattern.

Futon furniture in recent years has become a popular alternative to standard upholstered furniture. Futon sofas, loveseats and chairs can be repositioned so that the furniture can be used as a bed. Traditionally, polyurethane foam has been combined with other types of cushioning materials such as cotton batting, latex rubber, and various man-made fiber products in order to impart the desired comfort characteristics to a final product. With time and use, the various types and combinations of materials take on different degrees of set as a result of compression from the weight of a human body. As is often the case with the softer materials, the final product will take more set over time with continued use. The more set the product takes over time, the more comfort, flexibility and height is lost from the product. It is desirable to bend, fold and/or roll up a futon mattress to be used as a sofa or for storage when the futon is not used as a flat sleep surface. Yet, when the futon is used as a sleep surface it must be stiff enough to span slats in a bed frame. Preferably, the material used in making the futon would take on little or no set.

In our prior U.S. patent application Ser. No. 09/363,726 filed Jul. 29, 1999 and Ser. No. 10/124,106 filed Apr. 17, 2002, both entitled "Convoluted Surface Fiber Pad" and since issued as U.S. Pat. Nos. 6,500,292 and 6,40,610, respectively, and hereby incorporated by reference as if reproduced in their entirety, we disclosed a non-woven fiber pad having a convoluted surface and an integral relatively thin but stiff base formed from a non-woven fiber batt. To form the non-woven fiber pad, a non-woven fiber batt is introduced between a pair of counter-rotating drums, at least one of which has a convoluted surface. As the non-woven fiber batt is drawn between the counter-rotating drums, the convolutions upon the surface of at least one roller compresses the surface of the non-woven fiber batt in frictional engagement therewith to a greater or lesser degree depending on the degree of surface relief of the roller convolutions. A heated wire is placed generally parallel to and between the pair of drums so that, as the non-woven fiber batt is drawn between the drums and compressed by the drum convolutions, the heated wire cuts through the non-woven fiber batt to create a cut-pattern generally mirroring the convolutions on the surface of the drum compressing the non-woven fiber batt. The aforementioned cut-pattern results because, whenever a drum convolution compresses the non-woven fiber batt in the vicinity of the heated wire, the wire will pass through the non-woven fiber batt at a point nearer to the batt surface which is in contact with the drum convolution.

SUMMARY

In various embodiments thereof, the present invention is directed to a fiber pad comprised of a non-woven fiber batt having a first, generally flat, surface and a second, convoluted, surface. The non-woven fiber batt may further include an unconvoluted base and a number of projections integrally formed with the unconvoluted base. Variously, the projections may be configured as: (a) free-standing peaks spaced apart from the other peaks; (2) free-standing ridges spaced apart from the other free-standing ridges; or (3) free-standing wavy ridges spaced apart from the other free-standing wavy ridges.

In further aspects thereof, the fiber pad extends in longitudinal, lateral and transverse dimensions. Variously, the non-woven fiber batt may be comprised of: (1) fibers oriented substantially horizontally along the longitudinal and transverse dimensions of the fiber pad; (2) fibers oriented substantially horizontally along the longitudinal and transverse dimensions of the fiber pad and substantially vertically along the lateral dimension of the fiber pad; or (3) fibers oriented substantially vertically along the lateral dimension of the fiber pad.

In various further aspects thereof, the non-woven fiber batt may be comprised of: (1) plural fibers spray-bonded to one another by an adhesive; or (2) a first plurality of high-melt fibers and a second plurality of low-melt fibers bonded to one another and to the first plurality of high melt fibers. In either of these aspects, the formation of the second, convoluted, surface does not weaken the bonds between the fibers. Finally, in still further aspects thereof, the fibers may be: (1) a blend of hollow, solid and crimped fibers having varying diameters and deniers; (2) synthetic fibers; or (3) polyester fibers.

BRIEF DESCRIPTION OF THE DRAWINGS

For a more detailed description of the present invention, and for further details and advantages thereof, reference is now made to the Detailed Description which follows, when taken in conjunction with the accompanying drawings, in which.

DETAILED DESCRIPTION

Figure 1:
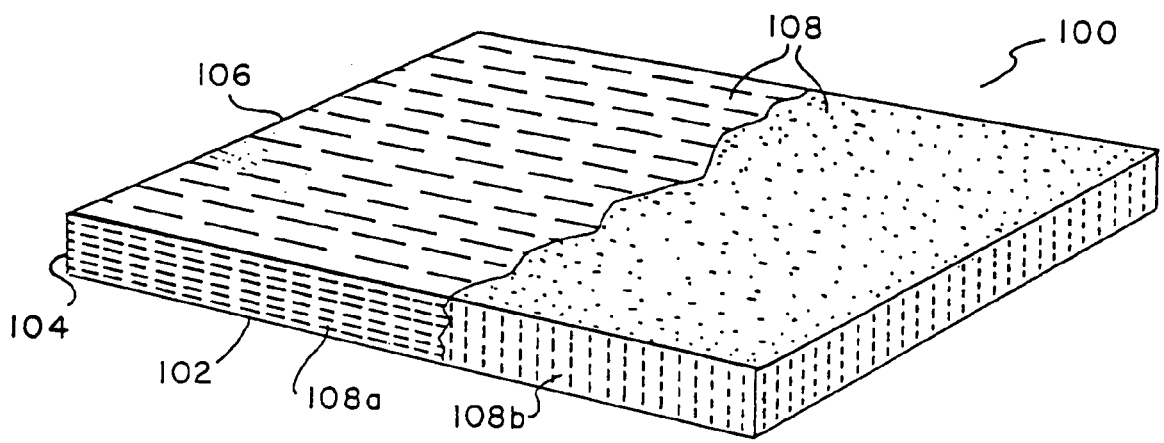
FIG. 1 is a perspective view of a non-woven fiber batt layer.

Referring to FIG. 1, a non-woven batt 100 having a longitudinal dimension 102, a lateral dimension 104 and a transverse dimension 106 will now be described in greater detail. The non-woven batt 100 may include a blend of different types of fibers 108 having varying diameters and deniers, and fibers which are hollow, solid and crimped. Blending different types of fibers 108 creates dead air spaces which contribute to the resiliency of the convoluted multi-layer pad 500 of FIGS. 6, 7 and 8 and lends to the integrity of the non-woven batt 100.

The fibers 108 of the non-woven batt 100 can be synthetic fibers which are known in the art, for example, polyester and polypropylene. In an alternative embodiment, the fibers 108 are substantially synthetic fibers having a melting point in the range of about 189°-206° C. (300°-330° F.). In the preferred embodiment, the fibers 108 are polyester fibers having a melting point substantially in the above specified range. However, other synthetic fibers known in the art also may be used, such as polypropylene, having melt ranges close to or below the above-specified range. Additionally, natural fibers such as camel, llama, wool, cashmere, or cotton can be incorporated with synthetic fibers to form the non-woven batt 100. Because natural fibers may tend to generate smoke when in contact with a heated cutter, the percentage of natural fiber incorporated into the non-woven batt 100 should be within a range which will not create an environmental or health hazard during a heated cutting operation.

The fibers 108 of the non-woven batt 100 can also be densified. As used herein, the term "densified fibers" hereby refers to fibers having a weight-to-thickness ratio of at least 57 grams (2 ounces) per 3.8 centimeters (1.5 inch) thickness for a 30.5 square centimeter (1 square foot) area of batt.

The fibers 108 can be oriented substantially horizontally 108a along the longitudinal dimension 102 and traverse dimension 106 of the non-woven batt 100. In an alternative embodiment, the non-woven batt 100 can be comprised of horizontally oriented fibers 108a, and vertically oriented fibers 108b along the lateral dimension 104 of the non-woven batt 100. In the preferred embodiment, the non-woven batt 100 is formed from substantially vertically oriented fibers 108b, as vertically oriented fibers 108b have better convolution retention properties as compared to horizontally oriented fibers 108a, as discussed below.

The batt 100 can be formed using one of the several processes for converting a source of fiber into a non-woven batt 100, as is known in the art. The fibers 108 may receive an application of a resin to improve the structural integrity of the non-woven batt 100, or alternatively may incorporate a portion of low melting fibers which will melt to bond high melt fibers in the non-woven batt 100 on application of heat. The ends of the fibers 108 in non-woven batt 100 may be brushed to improve the entwining of individual fibers of one end into adjacent ends. Adjacent ends of fibers 108 may be of substantially the same height, or, in the alternative, may have different heights in a repeating pattern. The structure and manufacture of a batt incorporating vertically oriented fibers is described in more detail in U.S. Pat. No. 5,702,801, the entire disclosure of which is incorporated herein by reference.

In the early stages of forming the non-woven batt 100 for the fibers 108, the non-woven batt 100 may have an initial thickness of up to about eighteen (18) inches. The fibers 108 are spray bonded together with an adhesive and then compressed by rolling the fibers 108 to form the non-woven batt 100, as is known in the art. In an alternative process, the fibers 108 are oven-baked together and then rolled and cooled to form the non-woven batt 100.

Figure 2:
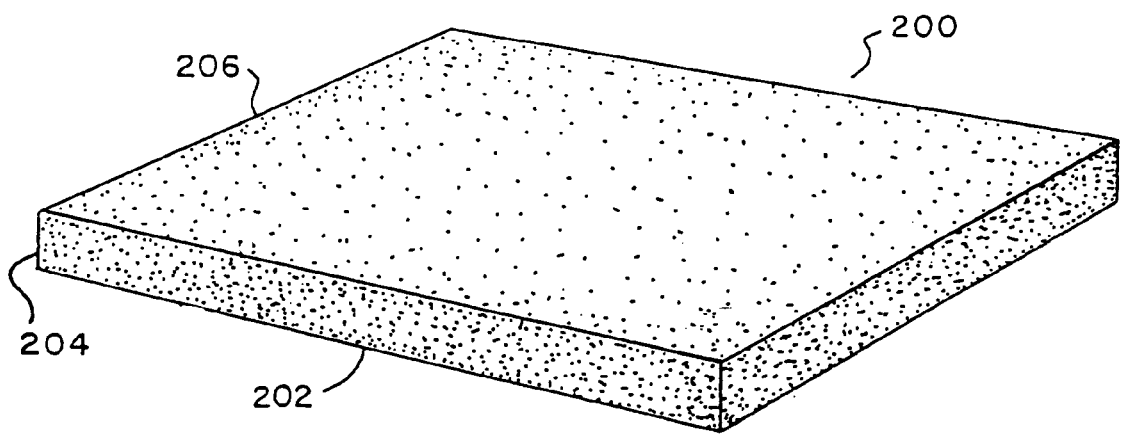
FIG. 2 is a perspective view of a foam layer.

Referring next to FIG. 2, a foam layer 200 has a longitudinal dimension 202, a lateral dimension 204 and a transverse dimension 206. The foam layer 200 preferably is a cellular foam structure which is resilient along its dimensions 202, 204, 206. The foam layer 200 compresses when weight or a load is placed along its dimensions 202, 204, 206 and returns generally to its original state when the weight or load is removed. The structure of a foam layer having a convoluted surface is described in U.S. Pat. No. 5,317,768, the entire disclosure of which is incorporated herein by reference.

The lateral dimension 204 of the foam layer 200 can be as large or as small as desired. In one alternate embodiment, the lateral dimension 204 is in the range of one half to three (½-3) inches. In another alternate embodiment, the lateral dimension 204 is in the range of one to one and one half (1-1½) inches. Finally, in the preferred embodiment, the lateral dimension 204 of the foam layer 200 is approximately 1¼ inches.

Figure 3:
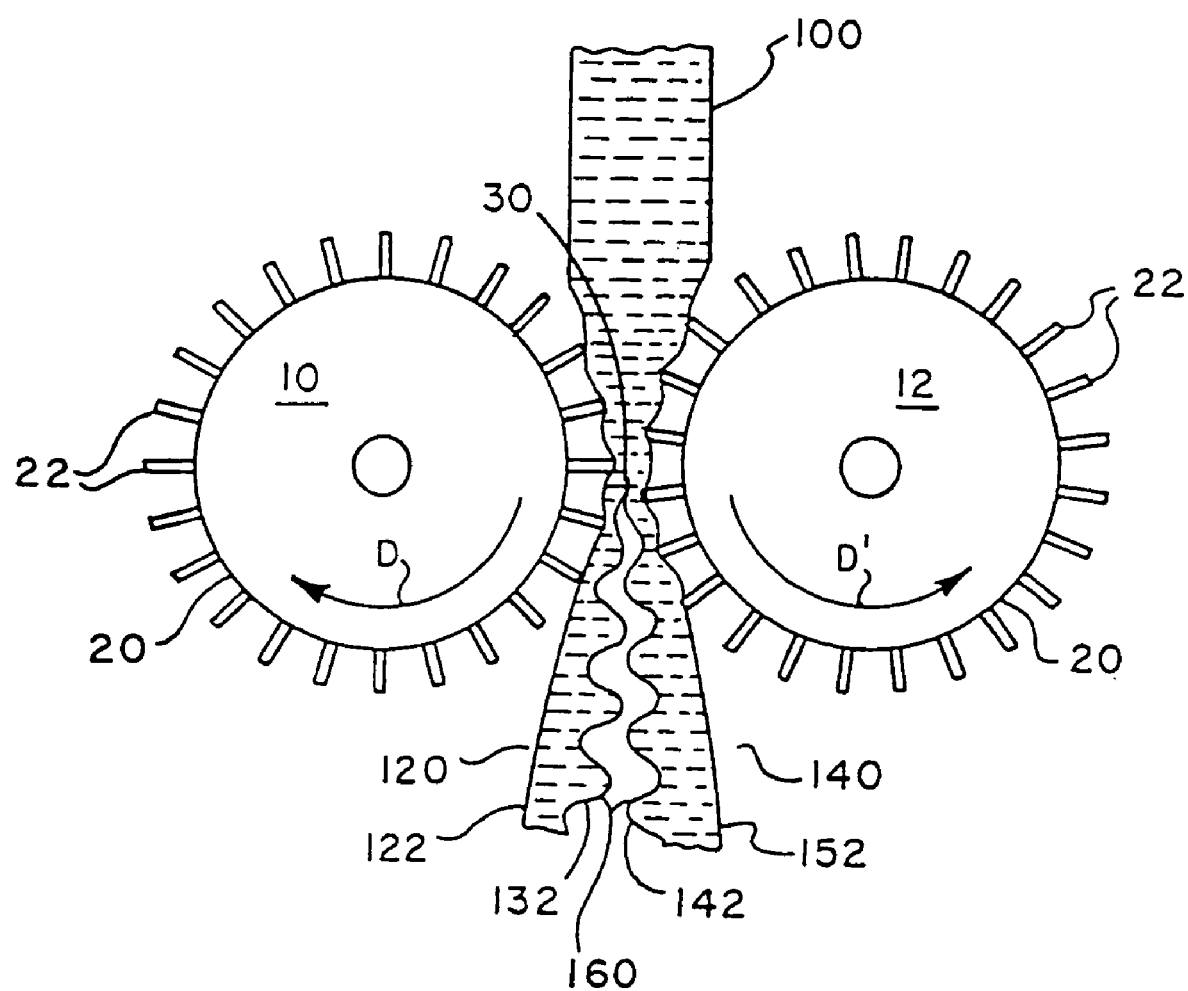
FIG. 3 is a schematic view of a device for separating a batt into first and second convoluted pads.

Referring next to FIG. 3, the process of forming non-woven batt 100 having a convoluted surface 160 is generally accomplished by transporting the non-woven batt 100 along its longitudinal dimension 102 while compressing the non-woven batt 100 along its lateral dimension 104. Concomitantly with compression, the non-woven batt 100 is cut transversely along its lateral dimension 104 to separate the non-woven batt 100 into an upper segment 120 and a lower segment 140 to provide conforming convoluted surface 160 of the batt upper and lower segments 120, 140. The batt upper and lower segments 120, 140 each have an upper surface 122, 142 and a lower surface 132, 152, respectively. The convoluted surface 160 of the batt upper segment 120 is proximate to its lower surface 132. Conversely, the convoluted surface 160 of the batt lower segment 140 is proximate to its upper surface 152. Further details of the process for forming a non-woven fiber pad having a convoluted surface are disclosed in U.S. Pat. Nos. 6,500,292 and 6,740,610, both of which were previously incorporated by reference as if reproduced in their entirety.

Figure 4:
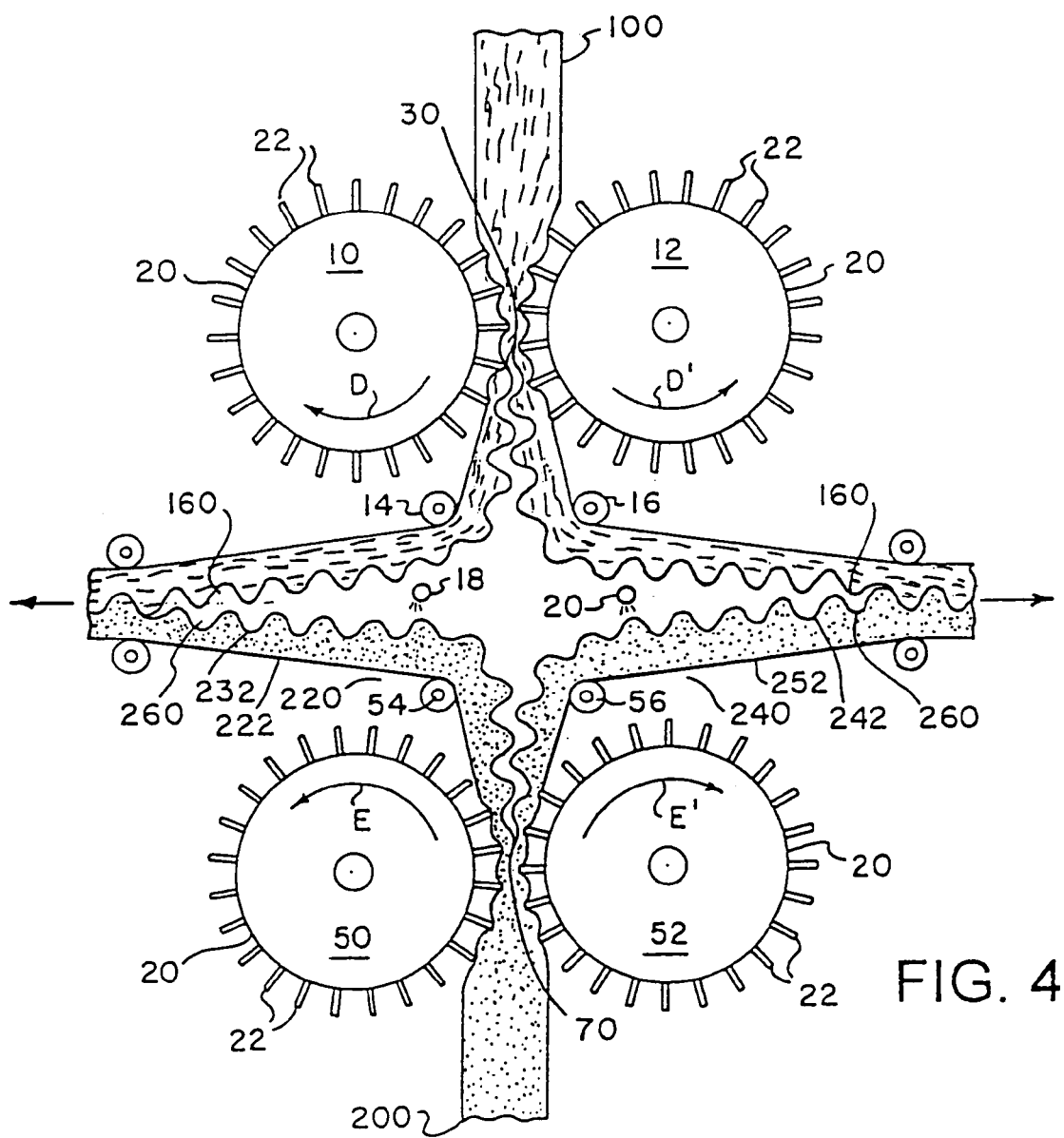
FIG. 4 is a schematic view of a device for forming a multi-layer pad having convoluted fiber and convoluted layers from the non-woven fiber batt of FIG. 1 and the foam batt of FIG. 2.

Referring next to FIG. 4, similar to the general process of forming non-woven batt 100 having a convoluted surface 160, the process of forming foam layer 200 having a convoluted surface 260 is generally accomplished by transporting the foam layer 200 along its longitudinal dimension 202 while compressing the foam layer 200 along its lateral dimension 204. Concomitantly with compression, the foam layer 200 is cut transversely along its lateral dimension 204 to separate the foam layer 200 into an upper segment 220 and a lower segment 240 and to provide conforming convoluted surface 260 of the foam layer upper and lower segments 220 240, respectively. The foam layer upper and lower segments 200, 240 each have an upper surface 222, 242 and a lower surface 232, 262, respectively. The convoluted surface 260 of the foam layer upper segment 220 is proximate to its lower surface 232. Conversely, the convoluted surface 260 of the foam layer lower segment 240 is proximate to its upper surface 242.

Figure 5:
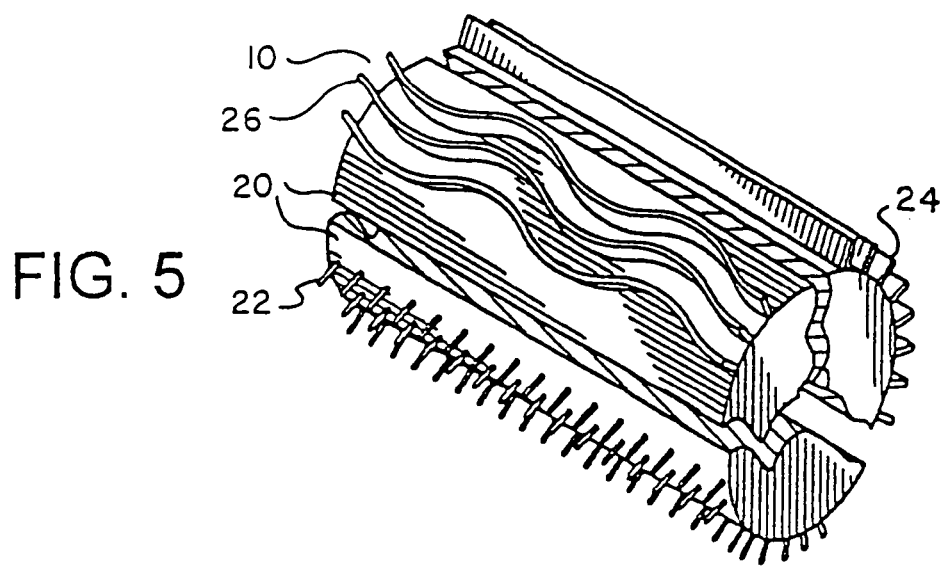
FIG. 5 is a perspective view of a drum forming part of the device of either FIG. 3 or FIG. 4 and having alternative embodiments of convoluted surfaces thereon.

Referring to FIGS. 3 and 5, the preferred embodiment for transporting the non-woven batt 100 along its longitudinal dimension 102 is accomplished by a conveyor belt (not shown), although it should be clearly understood that alternate embodiments are known in the art. Compression of the non-woven batt 100 along its lateral dimension 104 is preferably accomplished by a pair of drums 10, 12 having opposite rotational directions D, D'. As the conveyor belt introduces the non-woven batt 100 between the drums 10, 12, the drums 10, 12 draw the non-woven batt 100 into compression.

Drums 10, 12 each have a convoluted surface 20 with at least one raised pattern thereon. The raised pattern is generally comprised of a plurality of upstanding projections and depressions. Alternative embodiments of the raised pattern include a plurality of pegs 22, straight edges 24 or waved edges 26, although it is to be understood that alternative raised patterns are known in the art. The convoluted surface 20 of drum 10 should not intermesh or come in contact with the convoluted surface 20 of opposite drum 12 as the drums 10, 12 rotate. In an alternative embodiment, only one of the drums 10, 12 has a convoluted surface 20 while the other of the drums 10, 12 does not have a convoluted surface 20 which operates to facilitate the drawing of the batt 100 through the drums 10, 12.

As the non-woven batt 100 is drawn into frictional engagement with the drum 10 and drum 12, the convoluted surface 20 of either of drum 10 or drum 12 compresses the non-woven batt 100 along its lateral dimension 104 towards the opposite drum 12, 10, respectively. A cutting device 30, schematically shown as an X, is positioned generally parallel to and between drum 10 and drum 12, and along the lateral dimension 104 of non-woven batt 100 as the non-woven batt 100 is transported between the drums 10, 12. In the preferred embodiment, the cutting device 30 is positioned proximate the location along the longitudinal dimension 102 of the non-woven batt 100 generally where the convoluted surface 20 of drum 10 or drum 12 compresses the non-woven batt 100.

As the non-woven batt 100 encounters the cutting device 30, the cutting device 30 cuts through the non-woven batt 100 transversely and along the lateral dimension 104 to separate non-woven batt 100 into an upper segment 120 and a lower segment 140, each segment 120, 140 having an upper surface 122, 142 and a lower surface 132, 152, respectively. The cutting device 30 cuts through the non-woven batt 100 at a point along its lateral dimension 104 either nearer to the upper surface 122 of the batt upper segment 120 or to the lower surface 152 of the batt lower segment 140, whichever surface 122 or 152 is in contact with the convoluted surface 20, thus creating convoluted surface 160 of non-woven batt 100.

Returning momentarily to FIG. 4, the preferred embodiment for convoluting the foam layer 200 is similar to the process for convoluting the non-woven batt 100. Transportation of the foam layer 200 along its longitudinal dimension 202 is accomplished with a conveyor belt (not shown), although it is to be understood that alternate embodiments are known in the art. Compression of the foam layer 202 along its lateral dimension 204 is preferably accomplished by a pair of drums, 50, 52 having opposite rotational directions E, E'. As the conveyor belt introduces the foam layer 200 between drums 50, 52, the drums 50, 52 draw the foam layer 200 to compression. Drums 50, 52 each have a convoluted surface 20 with at least one raised pattern thereon which corresponds to the raised pattern of drums 10, 12. The convoluted surface 20 of drum 50 should not intermesh or come in contact with the convoluted surface 20 of opposite drum 52 as the drums 50, 52 rotate. In an alternative embodiment, only one of the drums 50, 52 has a convoluted surface 20 while the other of the drums 50, 52 does not have a convoluted surface 20 which operates to facilitate the drawing of the foam layer 200 through the drums 50, 52.

As the foam layer 200 is drawn into frictional engagement with drum 50 and drum 52, the convoluted surface 20 of either drum 50 or drum 52 compresses the foam layer 200 along its lateral dimension 204 towards the opposite drum 52, 50, respectively. A cutting device 70, schematically shown as a Y, is positioned generally parallel to and between drum 50 and drum 52, and along the lateral dimension 204 of foam layer 200 as the foam layer 200 is transported between the drums 50, 52. In the preferred embodiment, the cutting device 70 is positioned proximate the location along the longitudinal dimension 202 of foam layer 200 where the convoluted surface 20 of drums 50, 52 compresses the foam layer 200. As the foam layer 200 encounters the cutting device 70, the cutting device 70 cuts through the foam layer 200 transversely and along the lateral dimension 204 to separate foam layer 200 into an upper segment 220 and a lower segment 240, each segment 220, 240 having an upper surface 222, 243 and a lower surface 232, 252, respectively. The cutting device 70 cuts through the foam layer 200 at a point along its lateral dimension 204 either nearer to the upper surface 222 of the foam layer supper segment 220 or to the lower surface 262 of the foam layer lower segment 240, whichever upper 222 or 252 is in contact with the convoluted surface 20.

It will be understood by those in the art that the drums 10, 12 may be positioned closer to or further away from each other depending on lateral dimension 104 of the non-woven batt 100 to be convoluted. Similarly, the distance between drums 50, 52 may be positioned depending on the lateral dimension 204 of the foam layer 200 to be convoluted. In the preferred embodiment, the convoluted surface 20 of drum 10 does not come into contact with or intermesh with the convoluted surface 20 of drum 12 to prevent the cutting device 30 from cutting through the upper surface 122 of the batt upper segment 120 or the lower surface 152 of the batt lower segment 140. Similarly, in the process for convoluting the foam layer 200, the convoluted surface 20 of drum 50 does not come into contact with or intermesh with the convoluted surface 20 of drum 52 to prevent the cutting device 70 from cutting through the upper surface 222 of the foam upper segment 220 or the lower surface 252 of the foam lower segment 240.

The cutting devices 30, 70 can be heated cutters. In the preferred embodiment, cutting devices 30, 70 or hot wires. The heated cutters of cutting devices 30, 70 can be heated above the melting point of the fibers 108 of the non-woven batt 100 and of the foam 200, respectively, in order to speed the cutting process. For polyester fibers of the non-woven batt 100, the cutting device 30 should be heated in the range of about 189°-206° C. (300°-330° F.). For non-woven batt 100 formed from synthetic fibers 108 having a low melting point, as the heated cutter 30 cuts through the non-woven batt 100, the lower surface 132 of the batt upper segment 120 and the upper surface 142 of the batt lower segment 140 are bonded as fibers 108 lose their original plastic memory and then reform as a skin during cooling.

Figure 6:
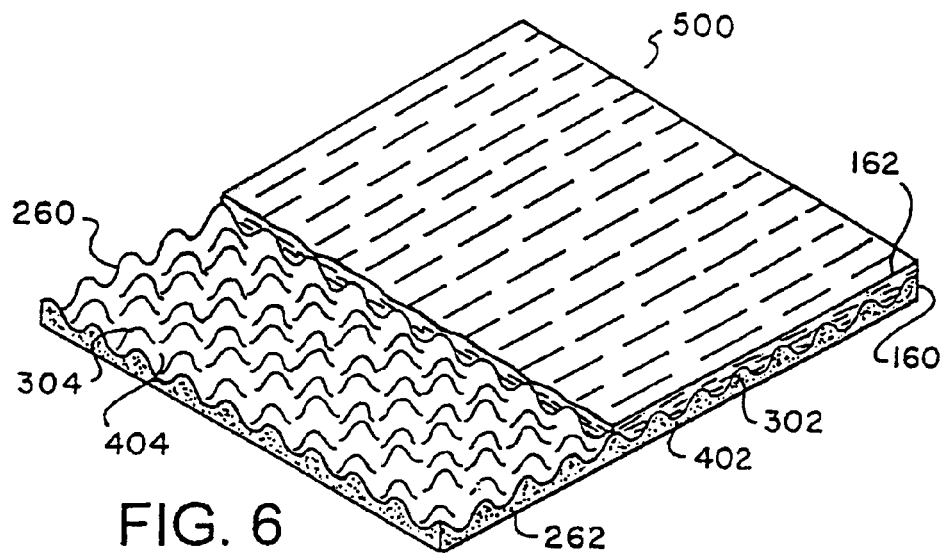
FIG. 6 is a perspective view of a multi-layer pad formed of conforming non-woven fiber and foam batts which is sectioned to show a first type of convoluted surface for the batts.
Figure 7:
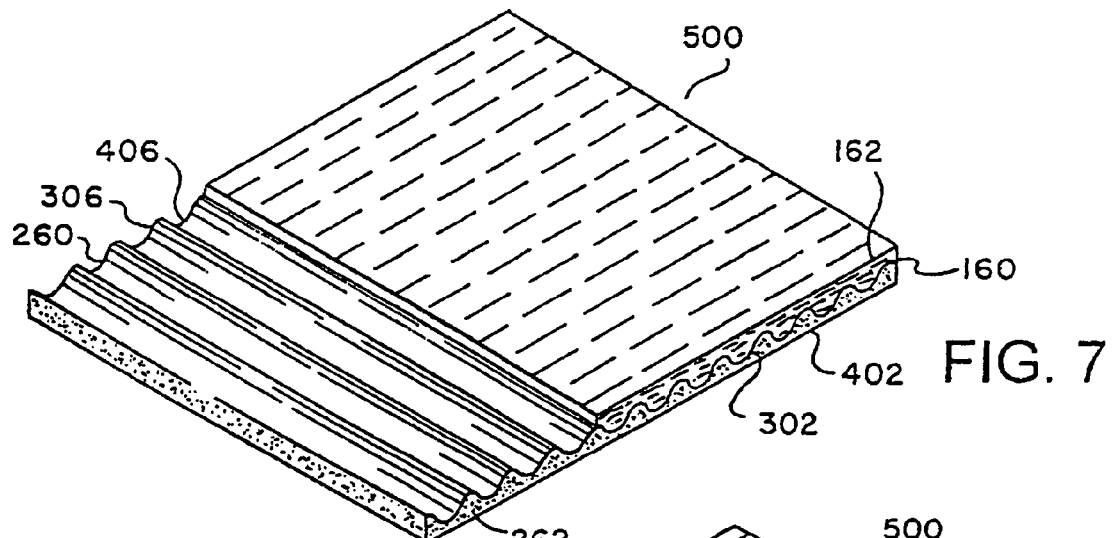
FIG. 7 is a perspective view of a multi-layer pad formed of conforming non-woven fiber and foam batts which is sectioned to show a second type of convoluted surface for the batts.
Figure 8:
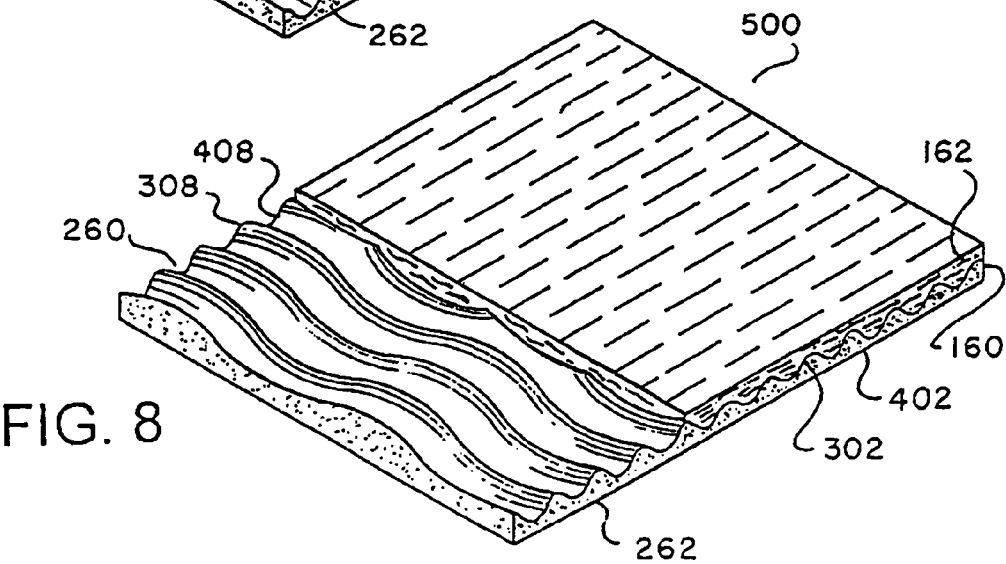
FIG. 8 is a perspective view of a multi-layer pad formed of conforming non-woven fiber and foam batts sectioned to show a third type of convoluted surface for the batts.

Referring next to FIGS. 6, 7 and 8, convoluted surfaces 160, 260 of the non-woven batt 100 and foam layer 200, respectively, are generally comprised of projections 302 and depressions 402 having different patterns and configurations depending upon the convoluted surface 20 of the drums 10, 12, 50, 52. For example, a plurality of pegs 22 of drum convoluted surface 20 forms a plurality of peaks 304 and basins 404 on convoluted surfaces 160, 260 of non-woven batt 100 and foam layer 200. A plurality of straight edges 24 on the drum convoluted surface 20 forms ridges 306 and valleys 406 on convoluted surfaces 160, 260 of non-woven fiber batt 100 and the foam layer 200. Waved ridges 308 and waved valleys 408 on convoluted surfaces 160, 260 of the fiber batt 100 and foam layer 200 are formed of waved ridges on the convoluted surface 20 of the drum.

Returning momentarily to FIG. 4, generally the process for forming a convoluted combination fiber and foam pad includes disposing the convoluted surface 160 of at least one of the batt upper and lower segments 120, 140 in a conforming relationship to the convoluted surface 260 of at least one of the foam layer upper and lower segments 200, 240 to form a multi-layer pad of a non-woven fiber batt and foam layer having conforming convoluted surfaces. The cohesive nature of the non-woven batt 100 and the foam layer 200 would provide sufficient bonding in some applications. In alternative embodiments, the conforming convoluted surfaces 160, 260, of the batt 100 and fiber 200, respectively, could be bonded using various boding agents known in the art.

The preferred embodiment for forming a multi-layer pad comprised of a non-woven batt and a foam layer having conforming convoluted surfaces is accomplished by aligning the pair of drums 10, 12 substantially above the pair of drums 50, 52 and convoluting the non-woven batt 100 and the foam layer 200, respectively, as discussed above. The raised pattern of convoluted surface 20 of drums 50, 52 corresponds to the raised pattern of convoluted surface 20 of drums 10, 12. Upon cutting and convoluting non-woven batt 100, the upper and lower segments 120, 140 of the non-woven batt 100 are transported in relatively opposite and substantially horizontal directions, the lower surface 132 of the batt upper segment 120 facing relatively downward and the upper surface 142 of the batt lower segment 140 facing relatively downward. Thus, the convoluted surface 160 of the batt upper and lower segment 120, 140 is facing relatively downward. In an alternative embodiment, a pair of counter rotating rollers 14, 16 located generally below drums 10, 12 assist in transporting the segments 120, 140 of the non-woven batt 100 in relatively opposite and substantially horizontal directions. In another alternative embodiment, a conveyor belt (not shown) proximate the surfaces opposite the convoluted surface 160 further assists in transporting the segments 120, 140 of the non-woven batt 100 in opposite and horizontal directions.

Similarly, upon convolution of the foam layer 200 as detailed above, the upper and lower segments 200, 240 of the foam layer 200 are transported in relatively opposite and substantially horizontal directions, the lower surface 232 of the foam layer upper segment 220 facing relatively upward and the upper surface 2452 of the foam layer lower segment 140 also facing relatively upward, and the convoluted surface 260 of the foam layer upper and lower segments 220, 240 facing relatively upward. In an alternative embodiment, a paid of counter rotating rollers 54, 56 located generally above drums 50, 52 assist in transporting the segments 220, 240 of the foam layer 200 in opposite and substantially horizontal directions. In another alternative embodiment, a conveyor belt (not shown) proximate the surfaces opposite the convoluted surface 260 further assists in transporting the segments 220, 240 of the foam layer 200 in opposite and horizontal directions.

As the segments 120, 140 of the non-woven batt 100, and the segments 220, 240 of the foam layer 200, are transported in opposite and generally horizontal directions, the batt upper segment 120 and the foam upper segment 220 come together laterally. Similarly, the batt lower segment 140 and the foam lower segment 240 laterally come together. In an alternative embodiment, the distance between conveyer belts (not shown) proximate the non-convoluted surfaces of the non-woven batt 100 and foam layer 200 are adjusted to accomplish the lateral movement. The batt convoluted surface 160 and the foam layer convoluted surface 260 are aligned to provide the upstanding projections 302 of the batt convoluted surface 160 to conform with or project into the depressions 402 of the foam convoluted surface 260, and the depressions 402 of the batt convoluted surface 160 to conform with or project into the upstanding projections 302 of the foam convoluted surface 260. In the preferred embodiment, alignment of the convoluted surfaces, 160, 260 is accomplished by controlling the rotational speeds of drums 10, 12 and of drums 50, 52, and adjusting the horizontal placement of the convoluted surfaces 160, 260 for proper alignment.

In an alternative embodiment as shown in FIG. 3, the peaks 304 of the batt and foam convoluted surfaces 160, 260, conform with or project into the corresponding basins 404 of the convoluted surfaces 260, 160 of the batt and foam, respectively. In another alternative embodiment shown in FIG. 4, the ridges 306 of the batt convoluted surface 160 and the foam convoluted surface 260 conform with or project into the corresponding valleys 406 of the foam convoluted surface 260 and the batt convoluted surface 160, respectively. In a further alternative embodiment shown in FIG. 5, the waved ridges 308 of the batt and foam convoluted surfaces 160, 260 conform with or project into the corresponding waved valleys 408 and batt convoluted surfaces 260, 160, respectively.

The convoluted surfaces 160, 260 of the batt 100 and foam layer 200 can be bonded together with a bonding agent. The bonding agent can be applied in various manners and stages throughout the process as is known in the art. In preferred embodiment, an apparatus 18, 20 sprays a bonding agent on at least one of the convoluted surfaces 160, 260 proximate rollers 14, 16 or rollers 54, 56.

Referring next to FIGS. 6, 7 and 8, a multi-layer pad 500 formed from a non-woven fiber batt 162 and a foam layer having conforming convoluted surfaces suitable for use in mattresses and cushions for sofas, loveseats, chairs and other upholstery products is shown. The multi-layer pad 500 has convoluted surfaces 160, 260 generally comprised of projections 302 and depressions 402 in different patterns and configurations depending upon the convoluted surface 20 of the drums 10, 12 and 50, 52. The convoluted surfaces 160, 260 remain integral with unconvoluted thin bases 162, 262 of the non-woven batt 100 and the foam layer 200, respectively, to retain stiffness for using the multi-layer pad 500 in items such as sofas, cushions and mattresses. For example, convoluted surface 160 and base 162 are formed from the same non-woven batt 100 and convoluted surface 260 and base 262 are formed from the same foam layer 200. The non-woven batt component 100 of the multi-layer pad 500 may be made of either substantially vertically oriented low melt fibers 108b or substantially horizontally oriented densified low melt fibers 108b. When the non-woven batt component 100 of the multi-layer pad 500 is made for vertically oriented fibers 108b, the projections 302 of convoluted surface 160 have a greater ability to retain their shape when cut by the heated cutter 30, as the vertical orientation of fibers 108b resists sloughing off portions of the projections 302 during the convolution process.

In an alternative embodiment, projections 302 of the convoluted surfaces 160, 260 extend in the range of approximately one half to on (½-1) inch in a lateral direction from depressions 402. In the preferred embodiment, projections 302 extend approximately three fourths (¾) inch in a lateral direction from depressions 402. In another alternative embodiment, unconvoluted thin bases 162, 262 extend approximately one half (½) inch in the laterally.

Thus, there has been described and illustrated herein, a non-woven fiber batt, specifically, one having a first, generally flat, surface and a second, convoluted, surface, which is neither taught nor suggested by the prior art. To enhance the ability of the fiber batt to remain in the convoluted shape, in one aspect of the invention, the fibers of the fiber batt are arranged in a generally vertical orientation. However, those skilled in the art will appreciate that numerous variations and modifications thereof are possible without departing from the spirit and scope of the invention. Accordingly, the invention should not be limited to the specific embodiment or embodiments disclosed herein. Rather, the invention is to be defined solely by the following claims and equivalents thereof.

What is claimed is:

1. A fiber pad, comprising:
   a non-woven fiber batt having a first surface and a second surface;
   said first surface having a generally flat shape and said second surface having a convoluted shape;
   wherein said fiber pad has longitudinal, lateral and traverse dimensions; and
   wherein said non-woven fiber batt is formed from fibers and wherein each of said fibers is oriented substantially vertically along said lateral dimension of said fiber pad.

2. The fiber pad of claim 1, wherein said non-woven fiber ban is densified.

3. The fiber pad of claim 1, wherein said non-woven fiber batt is comprised of a plurality of fibers spray-bonded to one another by an adhesive and wherein formation of said second, convoluted, surface does not weaken the bonds between said plurality of fibers.

4. The fiber pad of claim 1, wherein said non-woven fiber batt is comprised of a first plurality of high-melt fibers and a second plurality of low-melt fibers bonded to one another and to said first plurality of high melt fibers and wherein formation of said convoluted surface does not weaken the bonds between said first and second plurality of fibers.

5. The fiber pad of claim 1, wherein said fibers are comprised of a blend of hollow, solid and crimped fibers having varying diameters and deniers.

6. The fiber pad of claim 1, wherein said fibers are synthetic.

7. The fiber pad of claim 6, wherein said synthetic fibers are polyester fibers.

8. A non-woven fiber batt comprising a plurality of fibers arranged such that a first surface of said non-woven fiber batt has a generally convoluted shape; wherein said non-woven fiber batt has longitudinal, lateral and transverse dimensions and wherein each of said plurality of fibers is oriented substantially vertically along said lateral dimension of said non-woven fiber batt.

9. The non-woven fiber batt of claim 8, wherein said non-woven fiber batt further comprises an unconvoluted base and a plurality of projections integrally formed with said unconvoluted base, each one of said plurality of projections including a free-standing peak spaced apart from said free-standing peaks of adjacent ones of said plurality of projections.

10. The non-woven fiber batt of claim 9, wherein said unconvoluted base extends at least about one-half inch laterally, and each of said plurality of projections extends at least about one-half inch laterally.

11. The non-woven fiber batt of claim 8, wherein said non-woven fiber ban further comprises an unconvoluted base and a plurality of projections integrally formed with said unconvoluted base, each one of said plurality of projections including a free-standing ridge spaced apart from said free-standing ridges of adjacent ones of said plurality of projections.

12. The non-woven fiber batt of claim 11, wherein said unconvoluted base extends at least about one-half inch laterally, and each of said plurality of projections extends at least about one-half inch laterally.

13. The non-woven fiber batt of claim 8, wherein said non-woven fiber batt further comprises an unconvoluted base and a plurality of projections integrally formed with said unconvoluted base, each one of said plurality of projections including a free-standing wavy ridge spaced apart from said free-standing wavy ridges of adjacent ones of said plurality of projections.

14. The non-woven fiber batt of claim 13, wherein said unconvoluted base extends at least about one-half inch laterally, and each of said plurality of projections extends at least about one-half inch laterally.

15. A fiber pad, comprising:
   a non-woven fiber batt formed of a plurality of fibers bonded to one another, said non-woven fiber batt having a first, generally planar, surface and a second, convoluted, surface;
   said non-woven fiber batt having a lateral dimension which extends from said first, generally planar, surface to said second, convoluted surface; and
   said plurality of fibers forming said non-woven fiber halt being oriented substantially vertically relative to said lateral dimension of said non-woven fiber batt;

wherein said vertically oriented fibers enhance a convolution retention property of said non-woven fiber batt.

16. A fiber pad comprising:
a non-woven fiber batt having a first surface and a second surface;
said first surface having a generally flat shape and said second surface having a convoluted shape;
wherein said non-woven fiber batt further comprises an unconvoluted base and a plurality of projections integrally formed with said unconvoluted base, and said unconvoluted base is at least about one-half inch thick.

17. The fiber pad of claim 16, wherein said plurality of projections are each at least about one-half inch thick.

18. A fiber pad, comprising:
a non-woven fiber batt having a first surface and a second surface;
said first surface having a generally flat shape and said second surface having a convoluted shape;
wherein said fiber pad has longitudinal, lateral and traverse dimensions; and
wherein said non-woven fiber batt further comprises an unconvoluted base and a plurality of projections integrally formed with said unconvoluted base, and each of said plurality of projections is equally spaced apart.

* * * * *